United States Patent Office 2,784,201
Patented Mar. 5, 1957

2,784,201

PROCESS OF MAKING ALKYLENE CARBONATES

Henry C. Chitwood, Charleston, W. Va., assignor to Union Carbide and Carbon Corporation, a corporation of New York No Drawing. Application August 11, 1953,
Serial No. 373,675

6 Claims. (Cl. 260—340.2)

This invention relates to an improved process for making alkylene carbonates of the type represented by ethylene carbonate, which is a low-melting solid, useful in the molten condition as a solvent for fiber-forming resins.

Ethylene carbonate has been made heretofore by the reaction of ethylene oxide and carbon dioxide at high pressures over suitable catalysts. This process requires equipment resistant to high pressures. Another method for making ethylene carbonate involves the reaction of ethylene chlorhydrin with sodium bicarbonate. However, this process produces water as a by-product and this causes considerable loss of product by hydrolysis to ethylene glycol, from which it is difficult to separate the ethylene carbonate.

The object of this invention is to provide a process for making ethylene carbonate which can be carried out at atmospheric pressure and which will give high yields of the desired product in a pure and readily isolated condition.

According to this invention, ethylene carbonate is made by reacting a sodium alkyl carbonate with ethylene chlorhydrin to form a mixed alkyl hydroxalkyl carbonate which, without the necessity for isolation, undergoes an internal ester exchange to form ethylene carbonate and the alkanol corresponding to the sodium alkyl carbonate initially used. The sodium alkyl carbonate is readily formed by the known reaction of a sodium alcoholate with carbon dioxide. The series of reactions may be represented as follows, using sodium methylate as an example of a sodium alcoholate:

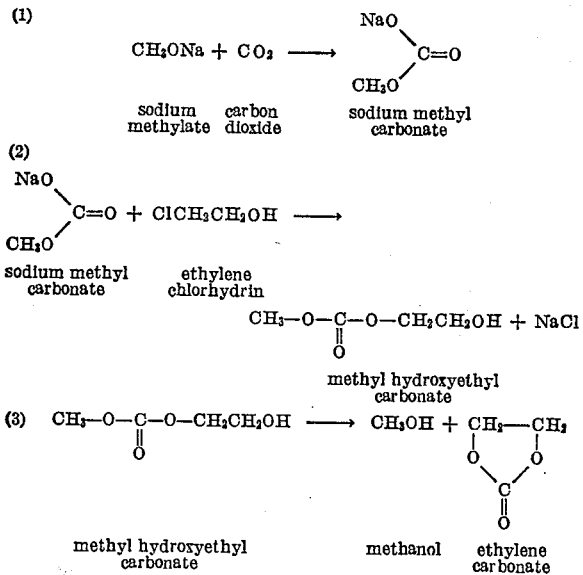

The alcohol used in the preparation of the alkali metal alcoholate may be any of the typical alkanols, the lower boiling ones such as methanol, ethanol, and butanol being preferred. Of these, the first two are the more convenient to use because the sodium alkyl carbonates formed therefrom are more granular in structure and thus easier to filter. Also, these alcohols, when regenerated in the final step of the synthesis, are easier to separate from the unreacted ethylene chlorhydrin.

While the sodium alcoholates are preferred because of their lower cost, any of the alcoholates of alkali metals, such as potassium or lithium, may be employed.

Likewise, in place of ethylene chlorhydrin, there may be used homologous alpha, beta-chlorhydrins, typified by propylene chlorhydrin, in which case propylene carbonate is obtained.

The reaction of the sodium alkyl carbonate with the chlorhydrin to form the alkyl hydroxyalkyl carbonate, and the internal ester exchange of this material to form the alkylene carbonate and the alkanol corresponding to the sodium alkyl carbonate, may be carried out simultaneously. Preferably the reaction mixture is heated to distill off the alkanol formed in the ester exchange.

The examples to follow will serve to illustrate the invention:

*Example I*

Six mols (324 g.) of sodium methylate was dissolved in 2780 g. of methanol, and the solution was stirred and cooled while carbon dioxide gas was bubbled into it. Sodium methyl carbonate precipitated during the addition. When the gain in weight corresponded to the addition of 6 mols (264 g.) of carbon dioxide, the sodium methyl carbonate was filtered out and dried in a desiccator. The dried material weighed 535 g. or 91% of the theoretical amount. It was suspended in 24.8 mols (2000 g.) of anhydrous ethylene chlorhydrin and heated and stirred in a flask fitted with a distilling column. Methanol was removed at the head of the column while the liquid boiled in the flask, starting at 101° C. and increasing to 133° C. at the end of a 4.5 hour period. During this time 5 mols (158 g.) of methanol (92.5% of the theoretical amount) was removed overhead.

The liquid remaining in the flask was freed of sodium chloride by filtration and distilled at reduced pressure. After removal of excess ethylene chlorhydrin and a small midfraction, a 408 g. fraction of ethylene carbonate distilled at 97°–101° C. at 5 mm. Hg pressure. With credit for an estimated 15 g. of ethylene carbonate contained in the midfraction and 10 g. remaining in the still, the yield was 92% of the theoretical obtainable from the sodium methyl carbonate used.

*Example II*

Four hundred fifty-two grams (4.03 mols) of sodium ethyl carbonate, prepared in a manner analogous to Example I was added to 1820 g. (22.6 mols) of ethylene chlorhydrin, and the mixture was heated to reflux for one hour. On filtration and distillation there was obtained 290 g. of ethylene carbonate, or an 82% yield. If the estimated 45 g. of product present on the filter cake had been recovered the yield would have been 95%.

*Example III*

Five mols (200 g.) of C. P. sodium hydroxide was dissolved in 1615 g. of butanol and heated on a still fitted with a decanting head to remove water. When the rate of water formation became very low, analyses indicated about 90% conversion of the sodium hydroxide to sodium butoxide and the distillation was stopped. Carbon dioxide was then added to the solution as in Example I until the gain in weight amounted to 220 g. corresponding to the addition of 5 mols of carbon dioxide.

The sodium butyl carbonate so obtained was filtered and suspended in 1600 g. (19.8 mols) of anhydrous ethylene chlorhydrin and heated to boiling in a still. Removal of the butanol formed in the reaction, together with that present in the sludge of sodium butyl carbonate, required 12 hours.

The reaction product was filtered and distilled under reduced pressure. After removal of the excess ethylene chlorhydrin and a small mid-cut, 308 g. of pure ethylene carbonate was obtained, boiling at 95°–100° C. at 5 mm. Hg pressure. With credit for 21 g. of product in the mid-cut and 43 g. held up in the distillation column, the yield was 85%, based on the sodium hydroxide originally used.

What is claimed is:

1. Process for making alkylene carbonates which comprises heating an alkali metal lower alkyl carbonate with a lower alpha, beta-alkylene chlorhydrin, and distilling from the reaction mixture an alkanol corresponding to the alkyl group of said alkali metal alkyl carbonate.

2. Process for making ethylene carbonate which comprises heating a sodium lower alkyl carbonate with ethylene chlorhydrin and distilling from the reaction mixture an alkanol corresponding to the alkyl group of said sodium alkyl carbonate.

3. Process for making propylene carbonate which comprises heating a sodium lower alkyl carbonate with propylene chlorhydrin and distilling from the reaction mixture an alkanol corresponding to the alkyl group of said sodium alkyl carbonate.

4. Process for making ethylene carbonate which comprises heating sodium methyl carbonate with ethylene chlorhydrin, and distilling methanol from the reaction mixture.

5. Process for making ethylene carbonate which comprises heating sodium ethyl carbonate with ethylene chlorhydrin, and distilling ethanol from the reaction mixture.

6. Process for making ethylene carbonate which comprises heating sodium butyl carbonate with ethylene chlorhydrin, and distilling butanol from the reaction mixture.

References Cited in the file of this patent

UNITED STATES PATENTS 1,907,891   Steimmig et al. _____ May 9, 1933

FOREIGN PATENTS 516,281   Germany _____ Jan. 22, 1931